United States Patent [19]
Forward

[11] 3,778,163
[45] Dec. 11, 1973

[54] ROTATION-RATE MEASURING APPARATUS
[75] Inventor: Robert L. Forward, Oxnard, Calif.
[73] Assignee: Hughes Aircraft Company, Culver City, Calif.
[22] Filed: Apr. 30, 1969
[21] Appl. No.: 832,537

Related U.S. Application Data
[63] Continuation of Ser. No. 555,018, June 3, 1966, abandoned.

[52] U.S. Cl............ 356/114, 356/116, 244/1 SA, 250/225, 250/231 GY
[51] Int. Cl. ........................................... G03b 27/04
[58] Field of Search............... 356/114, 116, 117, 356/119, 106 RL; 250/225, 231 GY; 244/1 SA; 324/160

[56] References Cited
UNITED STATES PATENTS
3,548,211  12/1970  Gardner............................ 250/233
3,693,082  9/1972  Jaecklin........................... 250/225

*Primary Examiner*—Benjamin A. Borchelt
*Assistant Examiner*—S. C. Buczinski
*Attorney*—James K. Haskell and Paul M. Cable

[57] ABSTRACT

This invention is a gyro-type apparatus for sensing the rate of its rotation about a predetermined axis. In one embodiment, a light beam from an appropriate source is propagated through a drift region generally defined by two spaced optical polarizers having individual directions of polarization at a predetermined fixed angular relationship. Light energy passing through the far end of the drift region is detected to indicate the amount of change and direction of beam polarization that has taken place in the drift region due to the rotation of the apparatus.

9 Claims, 2 Drawing Figures

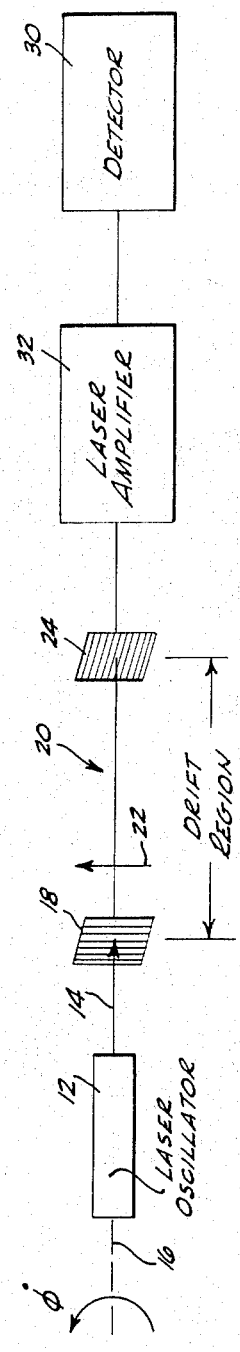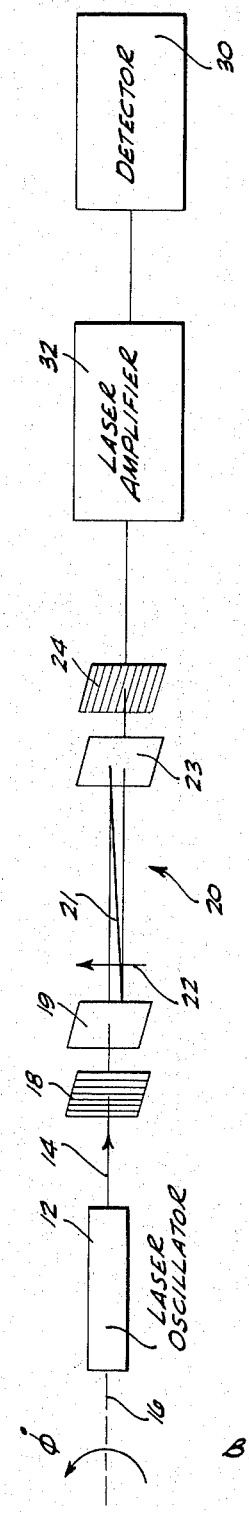

ROTATION-RATE MEASURING APPARATUS

This is a continuation application of an application Ser. No. 555,018, filed June 3, 1966, now abandoned, which was assigned to the assignee of the present application.

At present, most of the devices used to measure rotation rates are mechanical gyroscopes which are limited by their mechanical characteristics. With the development of lasers, a non-mechanical gyroscope using a laser as a source of light has been developed for measuring rotation rate. Though overcoming disadvantages characteristic of mechanical gyros, the sensitivity of the prior art laser rotation gyro is a function of the area of its structure. Consequently, to obtain sufficient sensitivity, it must be quite large, resulting in a bulky structure, which is often undesirable especially for use in space exploration.

It is therefore an object of the invention to provide a new rotation rate gyroscope which is not limited by the aformentioned disadvantages of the prior art.

Another object is to provide a new relatively simple laser rotation rate gyroscope.

A further object is to provide a novel laser rotation rate gyroscope, the sensitivity of which is not a function of its structural area.

Still a further object is to provide a novel laser rotation rate gyro which is versatile, rugged and less bulky than prior art rotation rate sensing devices.

These and other objects are achieved by providing an apparatus which includes an electromagnetic wave energy beam generator such as a laser as a source of a light beam which is directed in the direction about which the rate of rotation is to be measured. The light beam is polarized by a light polarizer in a first selected direction of polarization. The polarizer defines one end of a drift region. Thus, the light inserted into the drift region is polarized in the selected direction. The other end of the drift region is defined by a second polarizer or analyzer, which passes therethrough in a selected second direction components of light which impinge thereon. Thus, the portion of the light passing out of the drift region depends on the angular relationship between the first and second selected directions and the rate of rotation of the apparatus.

In one embodiment of the invention, the second polarizer is oriented at right angles to the direction of polarization produced by the first polarizer. Therefore, in the absence of rotation, the light arriving at the second polarizer is polarized in a direction at right angles to the direction at which the second polarizer passes light therethrough. Consequently, no light passes through the second polarizer. However, when the apparatus is rotated about the beam axis during the time that polarized light or photons move through the drift region, the photons arriving at the second polarizer will no longer be at right angles to the direction of polarization of the second polarizer. As a result, a portion of the laser beam will pass through the second polarizer and will be detected by a sensing detector. By measuring the energy passing through the second polarizer, the rate of rotation of the apparatus about the beam axis is measurable.

The novel features that are considered characteristic of this invention are set forth with particularity in the appended claims. The invention itself both as to its organization and method of operation as well as additional objects and advantages thereof, will best be understood from the following description when read in connection with the accompanying drawing, in which:

FIG. 1 is a block diagram of one embodiment of the invention; and

FIG. 2 is a block diagram of another embodiment of the invention.

Attention is now directed to FIG. 1 which is a diagram of the apparatus of the present invention. The apparatus comprises a laser 12 providing a beam of light 14 directed along the axis of rotation 16 of the apparatus. A first polarizer 18 is vertically disposed in the path of the beam to polarize the beam directed thereto in a direction perpendicular to the axis of rotation. The laser, if desired, could be one that emits a plane polarized beam, thus eliminating the need for a first polarizer. The particular direction of polarization with respect to a reference plane such as the horizontal plane depends on the position of the polarizer about the axis of rotation. In the absence of rotation, assumed to be diagrammed in FIG. 1, the polarizer 18 is positioned so that the light beam entering a drift region 20, the entrance end of which is defined by polarizer 18, is vertically polarized, as indicated by arrow 22.

The other end or exit end of the drift region 20 is defined by a second polarizer 24, which serves as an analyzer, in that it permits only components of light or photons in a particular direction to pass therethrough, while inhibiting the passage of light or photons from other directions. Polarizer 24 is oriented at right angles with respect to polarizer 18. Thus, if polarizer 18 is assumed to polarize light in a vertical direction, polarizer 24 permits only horizontal components of light to pass therethrough.

From the foregoing, it should thus be appreciated that light passing through polarizer 18 is polarized in a direction perpendicular to the direction in which light passes through polarizer 24. Consequently, in the absence of rotation of the apparatus, the light passing through polarizer 18 arrives at polarizer 24 in a direction perpendicular to the direction through which light may pass therethrough, and therefore no light passes through the second polarizer. However, if the apparatus is rotated about its axis of rotation, which is the same as the axis of light beam 14, during the time that the polarized light or photons move through drift region 20, then the second polarizer is no longer exactly at right angles to the polarization axis of the beam. Consequently, a portion of the light beam will leak through the second polarizer 24.

The amount of light leaking through, which is directly related to the rate of rotation of the apparatus may be detected by a detector 30 which, if desired, may be preceded by a light amplifier, such as a laser amplifier 32. Thus, the rate of rotation of the apparatus may be determined by measuring the amount of light leaking through the second polarizer. In order to resolve the ambiguity in the direction of rotation, the second polarizer may be rotationally biased with respect to the first polarizer, so that some light leaks through the second polarizer even in the absence of rotation, with the amount of light increasing or decreasing depending on the direction of rotation. Another technique for resolving the direction of rotation is to sense the phase coherence between a portion of the laser light beam and the light leaking through the second polarizer.

The number of photons per second designated $\dot{n}$ arriving at the second polarizer 24 may be expressed as $$\dot{n} = (I\sin\theta/hf), \quad (1)$$

where $I$ is the initial intensity of the laser light beam in watts, $hf$ is the energy per photon, approximately equaling $2\times10^{-19}$ Joules and $\theta$ is the angle of precession of the polarization vector.

A high Q cavity may be used for the drift region 20. The cavity may comprise partially silvered mirrors 19 and 23 shown in FIG. 2 to which reference is made herein, wherein like elements to those shown in FIG. 1 are designated by like numerals. Mirrors 19 and 23 are placed adjacent polarizers 18 and 24 respectively so that the distance therebetween defines the cavity length. The Q is a function of back and forth bouncing of the light 21 between the two mirrors. When using a high Q cavity $\theta$ may be expressed as, $$\theta = (Q\dot{\phi}L/c),$$

where $L$ is the length of the cavity, $c$ the speed of light and $\dot{\phi}$ the rate of rotation in radians per second. Thus $\dot{n}$ can be expressed as $$\dot{n} \approx (IQ\dot{\phi}L/hfc), \text{ and}$$

$$(\dot{n}/\dot{\phi}) \approx (IQL/hfc).$$

Assuming that $I$ equals 100 milliwatts, $Q$ equals unity, $L$ the cavity length is 1 foot, $\dot{n}/\dot{\phi}$ equals $5\times10^8$ photons per radian. Thus for a rotation rate ($\dot{\phi}$) of 1 milliearth rate equaling $7.2\times10^{-8}$ radians/sec, the quantum noise limit is 36 photons/sec. By increasing the $Q$ of the cavity, the number of photons per second could be greatly increased.

From the foregoing description, it should thus be appreciated that the novel rotation-rate measuring apparatus of the present invention is based on sensing the amount of polarized light leaking out of a drift region, due to the rotation of polarizers defining the drift region during the time polarized light or photons travel through the drift region from the entrance to the exit ends thereof. The apparatus does not include mechanical moving parts and therefore is relatively insensitive to vibrations and is quite rugged. Also due to the absence of moving parts, it can be strapped down, further increasing its advantages.

Furthermore, since the sensitivity of the apparatus is not a function of its area but rather the length of the drift region, it can be made sufficiently long without becoming bulky as is the case with prior art devices.

It is appreciated that those familiar with the art may make modifications in the arrangements as shown for explanatory purposes rather than as a limitation without departing from the true spirit of the invention. Therefore, all such modifications and/or equivalents are deemed to fall within the scope of the invention as defined in the appended claims.

What is claimed is:

1. An apparatus for measuring the rate of rotation thereof, about a selected axis of rotation comprising:
   a source for providing a light beam polarized in a first plane and directed along said selected axis of rotation;
   polarizing means for polarizing a light beam directed thereto in a second plane which is fixedly angularly related to said first plane, said source and said polarizing means being disposed along the direction of said light beam to define a drift region as a function of the distance therebetween;
   first and second reflecting means disposed along said axis adjacent the respective ends of said drift region for providing an optical cavity therebetween; and
   detecting means for sensing the rate of rotation of said apparatus as a function of the energy entering said drift region from said source and emerging from said region through said polarizing means.

2. The apparatus defined in claim 1 wherein said source includes a laser for providing said light beam and a light polarizer disposed in the direction of said light beam to polarize it in said first plane, the distance between said polarizer and said polarizing means defining said drift region.

3. An apparatus for measuring the rate of rotation thereof about a selected axis of rotation comprising:
   a source for providing a light beam along a path aligned with said axis of rotation;
   a light polarizer disposed in said path for polarizing said light beam in a first direction perpendicular to said path;
   light responsive means disposed in said path for passing light directed thereto in a second direction perpendicular to said path, said second direction being at a predetermined fixed angular relationship with said first direction, whereby the light passing through said means is a function of the intensity of said light beam, the angular relationship between said first and second directions, and the rate of rotation of said light polarizer and said means;
   first and second reflecting means disposed along said path adjacent the respective locations of said light polarizer and said light responsive means for providing an optical cavity therebetween; and
   detecting means responsive to the light passing through said light responsive means for indicating the rate of rotation of said apparatus.

4. The apparatus defined in claim 3 wherein the angular relationship between said first and second direction is 90° whereby in the absence of rotation of said apparatus the light polarized by said light polarizer in said first direction is inhibited from passing through said light responsive means.

5. The apparatus defined in claim 4 wherein in the absence of rotation of said apparatus said first direction is a vertical direction and said second direction is a horizontal direction, said light responsive means passing only light components in a horizontal plane.

6. The apparatus defined in claim 3 wherein the angle between said first and second directions is less than 90°, whereby a portion of the light polarized in said first direction and passing through said drift region passes through said light responsive means in the absence of rotation of said apparatus.

7. An apparatus for measuring the rate of rotation thereof about a selected axis of rotation comprising:
   a laser providing a light beam directed along said axis of rotation;
   a polarizer perpendicularly disposed with respect to the direction of said beam and polarizing said beam in a first direction perpendicular to said axis, said polarizer defining an entrance end of a drift region;
   light responsive means defining an exit end of said drift region parallelly and fixedly disposed with respect to said polarizer at a distance equaling the length of said drift region for passing light therethrough only in a second direction at a predetermined angular relationship with respect to said first direction, whereby in the absence of rotation of said apparatus a predetermined portion of the light polarized in said first direction passes through said light responsive means, the portion of the light passing through said light responsive means varying from said predetermined portion as a function of the rate of rotation of said polarizer and said light responsive means about said axis of rotation;

first and second reflecting means disposed along said axis adjacent the respective locations of said polarizer and said light responsive means for providing an optical cavity therebetween; and means for sensing the portion of light passing through said light responsive means to provide an indication of the rate of rotation of said apparatus about said axis of rotation.

8. The apparatus of claim 7 wherein said predetermined angular relationship is a right angle whereby in the absence of rotation of said apparatus the light polarized in said first direction arrives at said light responsive means perpendicular to said second direction so that light is inhibited from passing through said light responsive means.

9. An apparatus for measuring the rate of rotation thereof about a selected axis of rotation comprising:

a source for providing an electromagnetic energy beam polarized in a first plane and directed along said selected axis of rotation;

polarizing means for polarizing an electromagnetic energy beam directed thereto in a second plane which is fixedly angularly related to said first plane, said source and said polarizing means being disposed along the direction of said beam to define a drift region as a function of the distance therebetween;

first and second electromagnetic energy reflecting means disposed along said axis adjacent the respective ends of said drift region for providing an electromagnetic energy reflecting cavity essentially coextensive with said drift region; and detecting means for sensing the rate of rotation of said apparatus as a function of the energy entering said drift region from said source and emerging from said region through said polarizing means.

* * * * *